3,151,358
APPARATUS FOR PRODUCING FLAT FILM FROM THERMOPLASTIC MATERIAL
Kenneth George Gerber, London, England, assignor to The Metal Box Company Limited, London, England, a British company
Filed Oct. 24, 1961, Ser. No. 147,235
10 Claims. (Cl. 18—14)

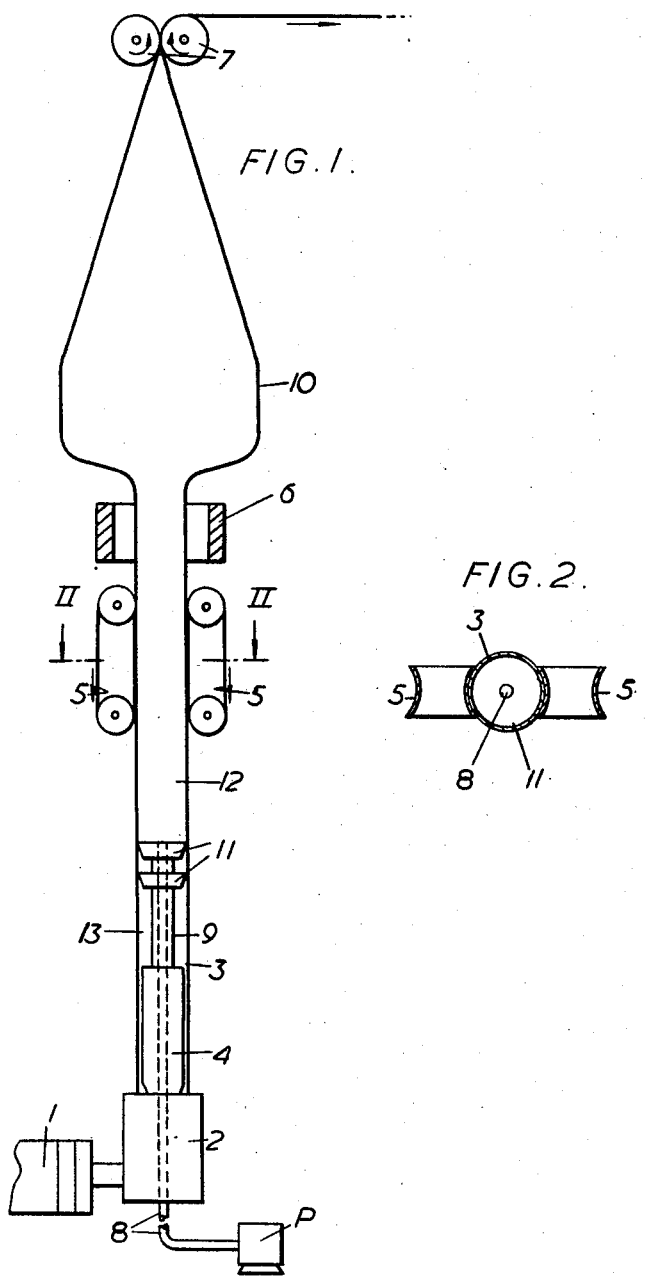

This invention relates to an improved apparatus for producing flat film composed of a synthetic organic normally solid polymeric thermoplastic material the nature of which is such that it can be melted at a temperature below the temperature at which it suffers chemical decomposition to form a viscous liquid having a viscosity such that it can be extruded through an annular die to form a tube, and which does not have a sharp melting point, but over a range of temperature, gradually changes from a soft solid to a viscous liquid without abrupt change in consistency when the temperature is gradually increased. Examples of each materials are polypropylene, polyethylene, polystyrene, and polyvinyl chloride and will be referred to hereinafter and in the appended claims as "thermoplastic material."

It has been proposed to produce flat film from thermoplastic material by extruding the molten material as a tube and while the material is still in a softened condition following the extrusion to form a bubble by applying fluid pressure to the interior of the tube at a position at which the extruded material is engaged between two pairs of nip rollers spaced apart in the direction of movement of the tube and operating to draw the tube away from the position of extrusion at different linear speeds. The pair of rollers most remote from the position of extrusion feed the material at a linear speed greater than that at which it is fed by the pair of rollers nearer the position of extrusion and due to this arrangement the material forming the bubble is stretched laterally and lengthwise.

With such known proposals, however, there is necessarily distortion of the material prior to the formation of the bubble and it is a main object of the present invention to provide a method of and an apparatus for forming flat film from thermoplastic material by the bubble process but which avoids substantial distortion of the extruded tube until it can be simultaneously stretched laterally and lengthwise.

Still further according to the invention there is provided apparatus for producing flat film from thermoplastic material comprising an extruder having a die through which a tube of said material can be continuously extruded towards a cooling device by which the tube is cooled and set, movable support elements shaped to conform to the periphery of the tube and engageable therewith to move it lengthwise past the cooling device towards a heater device operable to heat the cooled and set tube to a softening temperature which will permit orientation of the molecules of the material, means operable to introduce gas at super-atmospheric pressure into the interior of the heated portion of the tube, and nip rollers operable to flatten the heat-softened tube, to entrap therein gas introduced by said last-named means, and also to move the tube away from the heater device at a linear speed greater than that at which the tube is moved by said support elements thereby to effect simultaneous lateral and lengthwise stretching of the heat-softened portion of the tube.

In order that the invention may be clearly understood one embodiment thereof will now be described, by way of example, with reference to the accompanying diagrammatic drawings, in which:

FIGURE 1 diagrammatically illustrates apparatus according to the invention, and

FIGURE 2 is a section on line II—II, FIGURE 1.

Referring to the drawings, the thermoplastic material, for example polypropylene, is extruded, in known manner, by an extruder 1 through a die 2 which forms the material into a tube 3 which is drawn past a cooling can 4, of known construction, which maintains the tubular form while effecting setting of the thermoplastic material, by movable support elements comprising lengthwise moving belts 5 which engage the outer sides of the tube. The belts, preferably two in number, are arranged to engage opposite sides of the tube following setting thereof and are shaped to conform to the periphery of the tube as illustrated in FIGURE 2. The belts are made of resilient material such as soft rubber and, being conformed to the periphery of the tube, operate to maintain the tubular shape of the tube. Alternatively, if desired, the movable support elements may comprise a series of wheels the peripheries of which engage and are conformed to the outer sides of the tube.

After the tube leaves the belts 5 it passes through a tubular heating device 6 arranged to effect heating of the tube to a softening temperature which will permit orientation of the molecules of the thermoplastic material so that it can be stretched laterally and longitudinally. At a position past the heater device 6 the tube is engaged by a pair of co-operating nip rollers 7 which flatten the tube.

Gas, preferably air, at super-atmospheric pressure is introduced into the tube 3 through a pipe 8 which extends through the die 2, cooling can 4, and a sealing member 9 the purpose of which is described below. The pressurised gas, delivered from a source such as a pump P, enters the tube 3 at a position slightly in advance of that at which the tube is engaged by the belts 5 and the blocking of the air passage by the nip rollers 7 tends to increase the gas pressure between the heater device 6 and the nip rollers so that the compressed gas in this region acts on the heat-softened tube to effect lateral stretching thereof, and to form what is known as a bubble 10, as illustrated in FIGURE 1. The nip rollers 7 are arranged to move the laterally stretched tube at a linear speed which is greater than that at which the tube 3 is moved by the belts 5 and the nip rollers accordingly tend to effect lengthwise stretching of the material forming the bubble. The simultaneous lengthwise and lateral stretching of the tube causes biaxial orientation of the molecules of the material to form the bubble 10.

It is found that by arranging that the rollers 7 and belts 5 move with a linear speed ratio of up to 7:1 it is possible by orientation to produce a bubble 10 whose wall thickness is of the order of $\frac{1}{25}$ to $\frac{1}{50}$ of the wall thickness of the tube 3 before orientation. Thus it will be understood that the tube which is flattened by the nip rollers 7 is of considerably greater diameter than that of the tube 3 before orientation and is a flattened tube formed from a thin film of thermoplastic material.

As can be seen from FIGURE 1, the sealing member 9 is provided with two frusto-conical tube-engaging elements 11 which are spaced apart axially and engage the interior sides of the tube 3. The sides of the elements 11 are divergent in the direction of movement of the tube 3 so that there is a minimum of friction between the tube 3 and the elements 11 while permitting the elements 11 to effect a seal with the sides of the tube such that while the tube section or zone 12 and bubble 10 contain gas at super-atmospheric pressure the section or zone 13 of the tube 3 remains at substantially atmospheric pressure and gas under pressure is prevented from entering zone 13 and from causing distortion of the tube by disturbing the melt extrusion in the region of the die 2. In the preferred embodiment of the invention two elements 11 are provided as described above but, if desired, a number of elements 11 greater than two may be provided and in some instances a single element 11 may be adequate.

From the foregoing description it will be understood that the elements 11 create in the interior of the lengthwise moving tube 3 two zones 12, 13 of which the first zone 13 extends from the position of extrusion of the tube 3 and the second zone 12 is created in continuation of the first zone. The seal formed by the elements 11 with the interior sides of the tube 3 ensures that the first zone 13 is maintained substantially at atmospheric pressure so that the cooling device 4 effects setting of the extruded thermoplastic material before the material is engaged by the gas at super-atmospheric pressure. Thus it is possible to introduce the gas under pressure into zone 12 without distortion thereof and to ensure that the bubble 10 is formed under controlled pressure, both lateral and lengthwise, because it is only as the tube 3 leaves the heater device 6 that the tube is softened sufficiently to permit orientation of the molecules of the thermoplastic material and at this time the tube is simultaneously subjected to the lateral and lengthwise stretching forces.

As illustrated in the drawings the tube 3 is extruded and moved in an upward direction, it is to be understood, however, that if desired the tube may be extruded and moved in a downward direction.

I claim:

1. Apparatus for producing flat film from thermoplastic material, comprising an extruder having a die through which a tube of said material can be continuously extruded, a cooling device located in the path of the extruded tube to effect cooling and setting of the tube, a heater device operable to heat the cooled and set tube to a softening temperature which will permit orientation of the molecules of the thermoplastic material, movable support elements shaped to conform to the periphery of the tube and engageable therewith to move it past the cooling device towards the heater device, a sealing member engageable with the interior sides of the tube to form therewith a seal by which the tube portion between said member and the die is maintained substantially at atmospheric pressure, means operable to introduce gas at super-atmospheric pressure through said sealing member into the interior of the portion of the tube softened by said heater device, and nip rollers operable to flatten the heat-softened tube, to entrap therein gas introduced by said last-named means, and also to move the tube away from the heater device at a linear speed greater than that at which the tube is moved by said support elements thereby to effect simultaneous lateral and lengthwise stretching of the heat-softened portion of the tube.

2. Apparatus according to claim 1, wherein the sealing member includes a frusto-conical element engageable with the interior of the tube and having sides divergent in the direction of movement of the tube.

3. Apparatus according to claim 2, wherein the sealing member includes at least two of said frusto-conical elements spaced apart axially of the tube.

4. Apparatus for producing flat film from thermoplastic material, comprising an extruder having a die through which a tube of said material can be continuously extruded, a cooling device located in the path of the extruded tube to effect cooling and setting of the tube, a heater device operable to heat the cooled and set tube to a softening temperature which will permit orientation of the molecules of the thermoplastic material, endless belts shaped to conform to the periphery of the tube and engageable therewith to move it past the cooling device towards the heater device, a sealing member engageable with the interior sides of the tube to form therewith a seal by which the tube portion between said member and the die is maintained substantially at atmospheric pressure, means operable to introduce gas at super-atmospheric pressure through said sealing member into the interior of the portion of the tube softened by said heater device, and nip rollers operable to flatten the heat-softened tube, to entrap therein gas introduced by said last-named means, and also to move the tube away from the heater device at a linear speed greater than that at which the tube is moved by said endless belts thereby to effect simultaneously lateral and lengthwise stretching of the heat-softened portion of the tube.

5. Apparatus according to claim 4, wherein the sealing member includes a frusto-conical element engageable with the interior of the tube and having sides divergent in the direction of movement of the tube.

6. Apparatus according to claim 5, wherein the sealing member includes at least two of said frusto-conical elements spaced apart axially of the tube.

7. Apparatus for producing flat film from thermoplastic material, comprising an extruder having a die through which a tube of said material can be continuously extruded, a cooling device located in the path of the extruded tube to effect cooling and setting of the tube, a heater device operable to heat the cooled and set tube to a softening temperature which will permit orientation of the molecules of the thermoplastic material, resilient endless belts shaped to conform to the periphery of the tube and engageable therewith to move it past the cooling device towards the heater device, a sealing member engageable with the interior sides of the tube to form therewith a seal by which the tube portion between said member and the die is maintained substantially at atmospheric pressure, means operable to introduce gas at super-atmospheric pressure through said sealing member into the interior of the portion of the tube softened by said heater device, and nip rollers operable to flatten the heat-softened tube, to entrap therein gas introduced by said last-named means, and also to move the tube away from the heater device at a linear speed greater than that at which the tube is moved by said endless belts thereby to effect simultaneous lateral and lengthwise stretching of the heat-softened portion of the tube.

8. Apparatus according to claim 7, wherein the sealing member includes a frusto-conical element engageable with the interior of the tube and having sides divergent in the direction of movement of the tube.

9. Apparatus according to claim 8, wherein the sealing member includes at least two of said frusto-conical elements spaced apart axially of the tube.

10. Apparatus for producing flat film from thermoplastic material, comprising an extruder having a die through which a tube of said material can be continuously extruded, a cooling device located in the path of the extruded tube to effect cooling and setting of the tube, a heater device operable to heat the cooled and set tube to a softening temperature which will permit orientation of the molecules of the thermoplastic material, tube engaging means operable to engage the periphery of the tube between the cooling and heater devices and to move it towards the heater device, a sealing member engageable with the interior sides of the tube at a position between the cooling and heater devices to form with the tube a seal preventing the entry into the tube portion between the sealing member and the cooling device of gas contained in the tube portion between the sealing member and the heater device, means operable to introduce gas at superatmospheric pressure through said sealing member into the interior of the portion of the tube softened by said heater device, and nip rollers operable to flatten the heat-softened tube, to entrap therein gas introduced by said last-named means, and also to move the tube away from the heater device at a linear speed greater than that at which the tube is moved by said tube engaging means thereby to effect simultaneous lateral and lengthwise stretching of the heat-softened portion of the tube.

References Cited in the file of this patent

UNITED STATES PATENTS

| | | |
|---|---|---|
| 1,612,509 | Henderson et al. | Dec. 28, 1926 |
| 2,317,687 | Larchor | Apr. 27, 1943 |
| 2,433,937 | Tornberg | Jan. 6, 1948 |
| 2,448,433 | Irons et al. | Aug. 31, 1948 |
| 2,814,071 | Allan et al. | Nov. 26, 1957 |
| 2,922,194 | Lampard et al. | Jan. 26, 1960 |
| 2,952,867 | Diedrich et al. | Sept. 20, 1960 |
| 2,961,711 | Diedrich et al. | Nov. 29, 1960 |
| 2,979,777 | Goldman | Apr. 18, 1961 |
| 2,987,765 | Cichelli | June 13, 1961 |
| 2,987,767 | Berry et al. | June 13, 1961 |

FOREIGN PATENTS

| | | |
|---|---|---|
| 1,211,176 | France | Mar. 14, 1960 |
| 840,191 | Great Britain | July 6, 1960 |